United States Patent [19]
Bohrer et al.

[11] Patent Number: 6,007,727
[45] Date of Patent: Dec. 28, 1999

[54] PROCESS FOR TREATING BY-PRODUCT OF OPTICAL FIBER FABRICATION

[75] Inventors: Michael Philip Bohrer, Lebanon; Edwin Arthur Chandross, Murray Hill; David Anton Mixon, Basking Ridge; Linda A. Psota-Kelty, Tinton Falls; Dennis J. Trevor, Clinton, all of N.J.

[73] Assignee: Lucent Technologies Inc., Murray Hill, N.J.

[21] Appl. No.: 09/036,715

[22] Filed: Mar. 6, 1998

[51] Int. Cl.[6] .................................................. C02F 1/72
[52] U.S. Cl. .......................... 210/759; 210/632; 210/903; 210/908
[58] Field of Search ..................... 210/759, 903, 210/908, 758, 632; 564/298; 260/1

[56] References Cited

U.S. PATENT DOCUMENTS

| | | | |
|---|---|---|---|
| 4,724,084 | 2/1988 | Pahmeier et al. | 210/709 |
| 4,994,614 | 2/1991 | Bauer et al. | 564/300 |
| 5,240,488 | 8/1993 | Chandross et al. | 65/3.11 |
| 5,356,539 | 10/1994 | Peter et al. | 210/668 |
| 5,464,766 | 11/1995 | Bruno | 210/632 |
| 5,608,112 | 3/1997 | Schwartz | 564/415 |
| 5,866,718 | 2/1999 | Prabhu | 564/298 |

FOREIGN PATENT DOCUMENTS

56-031424  3/1981  Japan .

OTHER PUBLICATIONS

"Gas Absorption", edited by Perry, R. H. et al., "Chemical Engineers Handbook", 5th edition, McGraw–Hill, pp. 14–2, 14–16, Dec. 1973.

"Organic Nitrogen Compounds. I. Peroxide Intermediates of Tertiary Alkylamine", by Oswald, A. et al., *Journal of Organic Chemistry*, vol. 28, No. 3, pp. 651–657 (Mar. 1963).

"Hydroperoxide Oxidations Catalyzed by Metals. II. The Oxidation of Tertiary Amines to Amine Oxides", by Sheng, M. N. et al., *The Journal of Organic Chemistry*, vol. 33, No. 3, pp. 588–657 (Feb. 1968).

*Primary Examiner*—Richard L. Chiesa
*Assistant Examiner*—Frank M. Lawrence, Jr.
*Attorney, Agent, or Firm*—Scott J. Rittman

[57] ABSTRACT

It has been found that in sol-gel processes utilizing TMAH, it is possible to treat a trimethylamine (TRIMA)-containing solution with hydrogen peroxide to form trimethylamine oxide—$(CH_3)_3N^+$—$O^-$ (TRIMAO), a water soluble compound which is less volatile and less odorous than TRIMA, and which is capable of being sent to a standard wastewater treatment plant. The hydrogen peroxide is generally added to the TRIMA-containing solution in a $H_2O_2$:TRIMA ratio of at least 3:1, advantageously at least 10:1. Because of the resultant TRIMAO solution's ability to be sent to a standard wastewater treatment facility, improved productivity and lowered expense of the overall fiber fabrication process are obtained. The invention is also suitable for treatment of triethylamine.

19 Claims, 5 Drawing Sheets

*FIG. 5*A
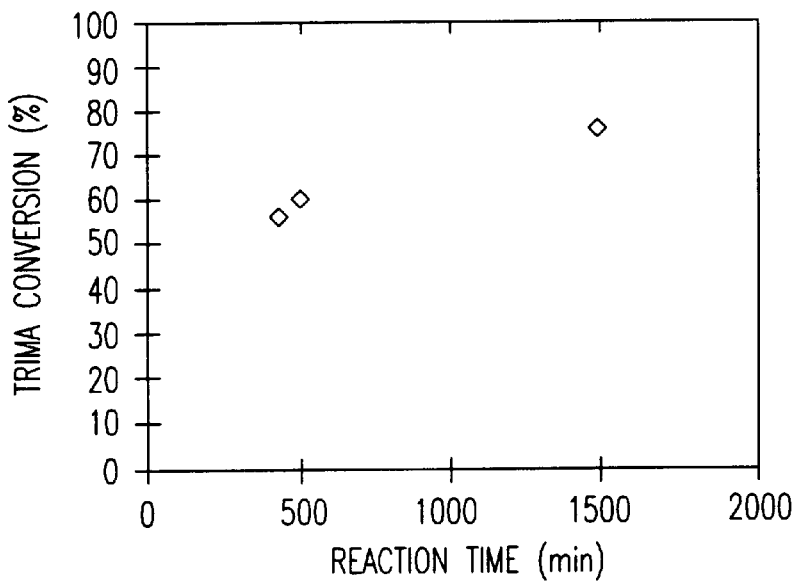
*FIG. 5*B
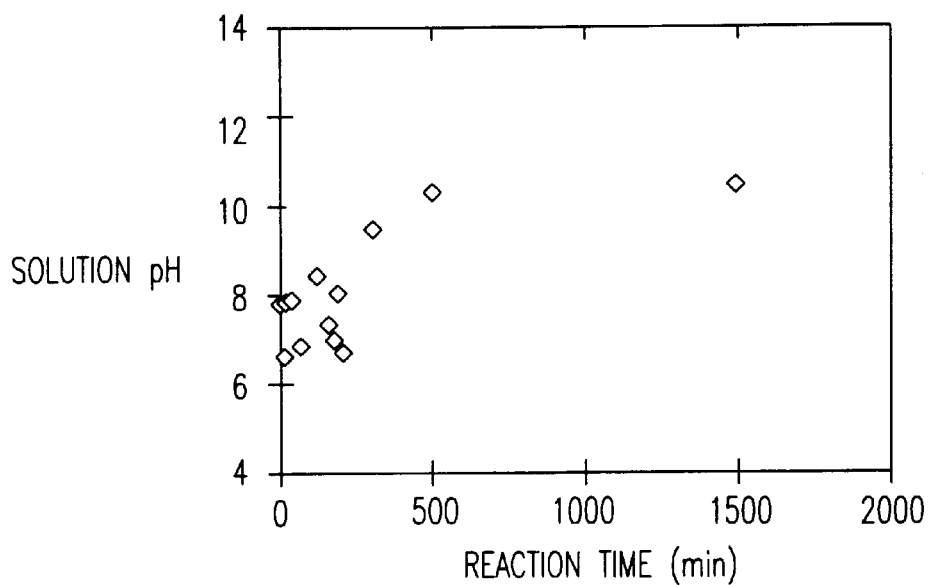

PROCESS FOR TREATING BY-PRODUCT OF OPTICAL FIBER FABRICATION

BACKGROUND OF THE INVENTION

1. Field of the Invention

The invention relates to optical fiber fabrication, in particular the disposal of by-products of such fabrication.

2. Discussion of the Related Art

Glass optical fiber is typically drawn from a solid preform containing an overcladding that surrounds an inner cladding and core. An overcladding tube is generally formed separately from the inner cladding and core, and the components are then brought together to make the preform. The overcladding does not have to meet the demanding purity and uniformity specifications of the core and inner cladding, and some efforts at improving manufacturing efficiency and lowering cost of optical fiber manufacturing processes have therefore focused on the overcladding. These efforts have led to the use of sol-gel processes to form overcladding tubes.

U.S. Pat. No. 5,240,488, the disclosure of which is hereby incorporated by reference, discloses a sol-gel process for production of overcladding tubes. In the process, an aqueous colloidal silica dispersion is used. The dispersion is typically stabilized by addition of a base such as tetramethylammonium hydroxide (TMAH). It is also possible to use tetraethylammonium hydroxide (TEAH). TMAH and TEAH are believed to stabilize silica particles by the following mechanism: Introduction of the TMAH or TEAH solution into a silica dispersion raises the pH value. The silica then takes on a negative surface charge due to ionization of silanol groups present on the surface, in accordance with the following reaction:

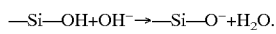

The negative charge on the silica particles creates mutual repulsion, preventing substantial agglomeration and maintaining the stability of the dispersion. At a later stage in the process, as discussed at Col. 15, lines 39–65 of the '488 patent, a gelling agent such as methyl formate is added to reduce the pH. The methyl formate, through reaction with water and/or base, neutralizes the negatively-charged silica to a degree where gelation is induced.

While processes such as that of the '488 patent produce good results, use of TMAH has caused some inconveniences in large-scale optical fiber fabrication. As shown in the Table in Cols. 11 and 12 of the '488 patent, once a gelled tube is dried, the tube must be heated to drive off volatile organic materials and water. During this heating, the tetramethylammonium salt that is present (e.g., tetramethyl ammonium formate in the reaction of the '488 patent) breaks down to an extent into trimethylamine (TRIMA), which has an undesirable odor, and is volatile and flammable. (TRIEA formed when using TEAH exhibits similar, undesirable properties.) The TRIMA or TRIEA is therefore burned or trapped and subsequently removed. Neither option is desirable, and both require significant off-line treatment that affects the productivity and expense of the overall fabrication process. Additionally, burning is expensive, and may lead to emission of undesirable gases that are removed by expensive emission controls.

Thus, the use of TMAH (or TEAH) in sol-gel overcladding fabrication has the potential to complicate an optical fiber manufacturing process. An easier, less-expensive method for disposing of TRIMA (or TRIEA) is desirable.

SUMMARY OF THE INVENTION

It has been found that in sol-gel processes utilizing TMAH, it is possible to treat the resultant TRIMA with hydrogen peroxide ($H_2O_2$), such that the detrimental effects of TRIMA on productivity and expense are substantially reduced or eliminated. In fact, surprisingly, the invention makes it possible to easily dispose of $H_2O_2$-treated TRIMA in a standard wastewater effluent stream (e.g., a municipal water treatment plant). The treatment of the invention is also suitable for TRIEA, as well as other trialkylamines with no more than 6 carbon atoms. Discussion of the chemical reactions of TRIMA is equally applicable to such other trialkylamines.

Initial attempts to dispose of TRIMA involved trapping the TRIMA in an aqueous acid solution, in order to form a salt solution that reduced TRIMA's volatility. The resultant solution, however, cannot be sent to a standard biological wastewater treatment plant (a standard biological wastewater treatment plant indicates a typical municipal treatment plant that utilizes microbes to purify the wastewater). It is possible to pass the salt solution through an oxidative burner, but, as mentioned previously, burning is expensive and generates undesirable gases. In contrast, for the process of the invention, TRIMA is interacted with hydrogen peroxide to promote oxidation to $(CH_3)_3N^+$—$O^-$, i.e., trimethylamine oxide (TRIMAO) a water soluble compound that has less volatility and toxicity than TRIMA.

In one embodiment, a TRIMA-containing aqueous acid solution (i.e., a TRIMA salt solution) is reacted with alkali and then with hydrogen peroxide. Specifically, the pH of the TRIMA salt solution is adjusted with the alkali to about 6 or higher, to provide free TRIMA to react with the hydrogen peroxide. After oxidation of the TRIMA, the alkaline solution is typically neutralized with aqueous acid for discharge to biological waste water treatment. It is also possible to destroy any excess peroxide prior to such discharge. (As used herein, "TRIMA-containing" solution or solution "comprising TRIMA" indicates TRIMA is present in its free amine form or as a salt.)

In another embodiment, the TRIMA in gaseous form, i.e., not trapped in an aqueous acid solution, is interacted directly with aqueous hydrogen peroxide, typically in a gas-liquid contactor. By directly interacting the TRIMA vapors and the aqueous hydrogen peroxide, this embodiment of the invention further reduces the complexity of the process of treating TRIMA. It is possible in this embodiment to use an acid solution, as discussed previously, to trap any TRIMA vapors present in the off-gases of the reaction.

Because the resultant TRIMAO solution is typically sent to a standard biological wastewater treatment facility, improved productivity and lowered expense of the overall fiber fabrication process are obtained. The invention thus offers a commercially significant and environmentally sound method for dealing with an undesirable (yet necessary) by-product of large-scale optical fiber fabrication processes.

BRIEF DESCRIPTION OF THE DRAWINGS

FIGS. 5A and 5B illustrate, respectively, the percentage of TRIMA converted to TRIMAO vs. reaction time, and the pH vs. reaction time, for another embodiment of the invention.

DETAILED DESCRIPTION OF THE INVENTION

Figure 1:
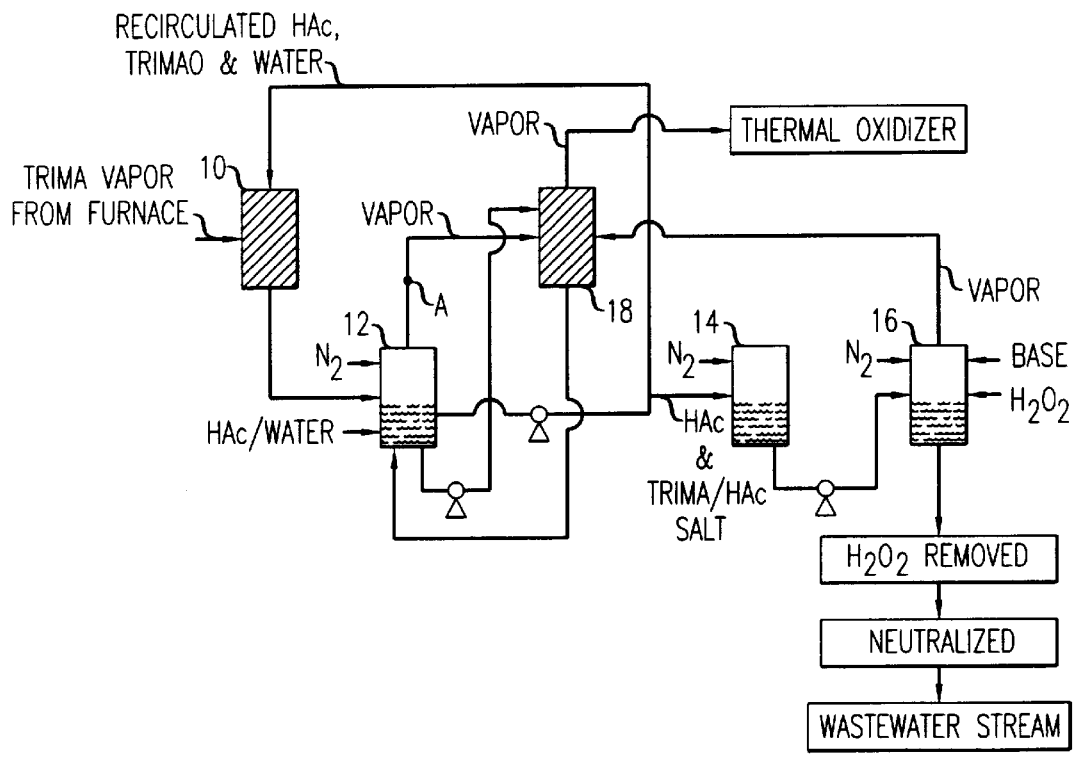
FIG. 1 schematically illustrates an apparatus suitable for practicing one embodiment of the invention.

In one embodiment, TRIMA, in the effluent of an optical fiber manufacturing process, is trapped in an aqueous acid solution to form a TRIMA salt solution, e.g.:

It is possible for the TRIMA vapor to be trapped in the aqueous acid solution by a variety of methods, including use of a conventional gas/liquid contactor, such as discussed in the *Chemical Engineers Handbook*, Perry and Chilton, ed., 5th Ed., McGraw-Hill, 1973, at 14-2. A variety of acids are capable of being used for the acid solution. Suitable acids have an acidity greater than or equal to the acidity of acetic acid, and typical acids include acetic, citric, and sulfuric. The aqueous acid solution is generally too acidic to be treated by the bacteria in a standard biological wastewater treatment facility. Yet raising the pH of the acid solution in an attempt to allow such standard wastewater treatment causes the odor of the free TRIMA to rise. The invention provides a TRIMA oxide solution capable of being sent to a standard biological wastewater treatment plant. (As mentioned previously, the treatment of the invention is also suitable for TRIEA and other trialkylamines with 6 or less carbon atoms, and all discussion of TRIMA is equally applicable to such other trialkylamines.)

Specifically, the TRIMA is transformed to $(CH_3)_3N^+—O^-$ (TRIMAO) according to the following oxidation reaction:

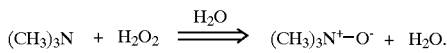

The TRIMA salt solution treated by this embodiment has too low a concentration of free amine to allow this reaction to proceed at a rate acceptable for most commercial applications, and the salt itself is not capable of being oxidized by the $H_2O_2$. Thus, to provide free TRIMA from the TRIMA salt, the pH of the solution is raised to about 6 or higher. (As used herein, reference to a pH value of "about $\chi$ or higher" indicates that the pH during the reaction peaks at that value $\chi$ or higher—it is possible for the pH to be lower during portions of the reaction or for the average pH to be lower.) The higher the pH, the greater the amount of free TRIMA available for conversion to TRIMAO. Advantageously, the pH is about 8 or higher, more advantageously about 13 or higher, in order to free increased amounts of TRIMA from the TRIMA salt. A pH of at least about 13 is typically required to free substantially all the TRIMA (i.e., at least 98%), such that substantially complete (i.e., at least 98%) conversion to TRIMAO occurs (or conversion to TRIMAO and other products capable of being sent to and treated by a standard wastewater treatment plant). The rate of the reaction is also dependent on the pH—the higher the pH, the greater the rate of reaction of free TRIMA with hydrogen peroxide. A base is added to raise the pH, and it is possible to add the base either before or after the TRIMA salt solution and the hydrogen peroxide are mixed, or to add base and hydrogen peroxide alternatively. A variety of bases are useful, particularly bases of an element from Group IA of the periodic chart. Sodium hydroxide and potassium hydroxide are particularly useful.

Advantageously, the $H_2O_2$:TRIMA mole ratio is at least about 3:1, more advantageously at least about 10:1, and this ratio is appropriate for other trialkylamines with 6 or less carbon atoms as well. The higher the mole ratio of hydrogen peroxide to TRIMA, the faster the rate of the reaction since there is more $H_2O_2$ available to contact and oxidize the free TRIMA. It is possible to use a control sample to determine the appropriate pH and $H_2O_2$:TRIMA mole ratio for a particular set of parameters, e.g., TRIMA concentration and temperature. Typically, the temperature of the reaction begins at room temperature, but rises due to the heat of reaction and the heat of decomposition of $H_2O_2$.

Typically, the TRIMA-containing aqueous acid solution will contain additional organic materials, such as methanol and various esters. The hydrogen peroxide undergoes decomposition in alkaline solution, resulting in bubbling and generation of heat. When TRIMA and $H_2O_2$ are mixed prior to adding a base, it is possible to better control such bubbling and heat generation by adding the base gradually. Again, it is possible to use a control sample to determine the appropriate rate of base addition for a particular set of parameters. It is also possible to cool the solution, to reduce some of the effects of the hydrogen peroxide decomposition.

Before sending the resultant TRIMAO-containing solution into the wastewater stream it is advantageous to remove, e.g., decompose, any remaining hydrogen peroxide. It is possible to remove the hydrogen peroxide by a catalytic process, e.g., passing the solution over a bed of finely-divided platinum or a transition metal oxide such as manganese dioxide. Alternatively, it is possible to employ an enzyme catalyst, such as catalase. It is also possible to dilute the waste stream to an extent that destruction of the excess hydrogen peroxide is unnecessary.

Finally, the resultant, TRIMAO-containing alkaline solution is typically neutralized, to a pH of about 7, for example by addition of an aqueous acid. Neutralization ensures that the TRIMAO solution will not damage the microbes of a standard biological wastewater treatment plant.

An apparatus suitable for performing this embodiment is shown schematically in FIG. 1. TRIMA vapor, and non-condensible gases such as $N_2$ and CO, from an optical fiber preform manufacturing process are passed into a gas/liquid contactor 10. Recirculated solution containing acetic acid (HAc), TRIMA salt, and water are directed into the contactor 10 from a first tank 12 to form the TRIMA salt solution from the TRIMA vapor. The aqueous acid is fed to the first tank 12 in an amount desired to form the TRIMA salt solution. $N_2$ gas is fed into the tank 12 to provide an inert gas blanket in the headspace. Acetic acid solution from the first tank 12 is pumped into the scrubber 18 to form a TRIMA salt solution from any TRIMA off-gases found in the scrubber 18. A portion of the acetic acid/TRIMA salt solution being recirculated from the first tank 12 is transferred into a second tank 14, which is essentially a holding tank for the salt solution. An $N_2$ blanket is typically provided over the solution in the tank 14. From the second tank 14, TRIMA salt solution is pumped into a third tank 16, which is a batch reactor for converting the TRIMA to TRIMAO. Base and hydrogen peroxide are added to the third tank 16, in the concentrations discussed previously to initiate the conversion to TRIMAO. Non-condensible gases, along with some TRIMA vapor, pass into the scrubber 18, where the TRIMA is converted back into a salt solution, and returned to the first tank 12. Once conversion is performed, the TRIMAO solution has any remaining hydrogen peroxide removed, the pH of the solution is adjusted to about 7, and the solution is passed into the standard wastewater stream.

Figure 2:
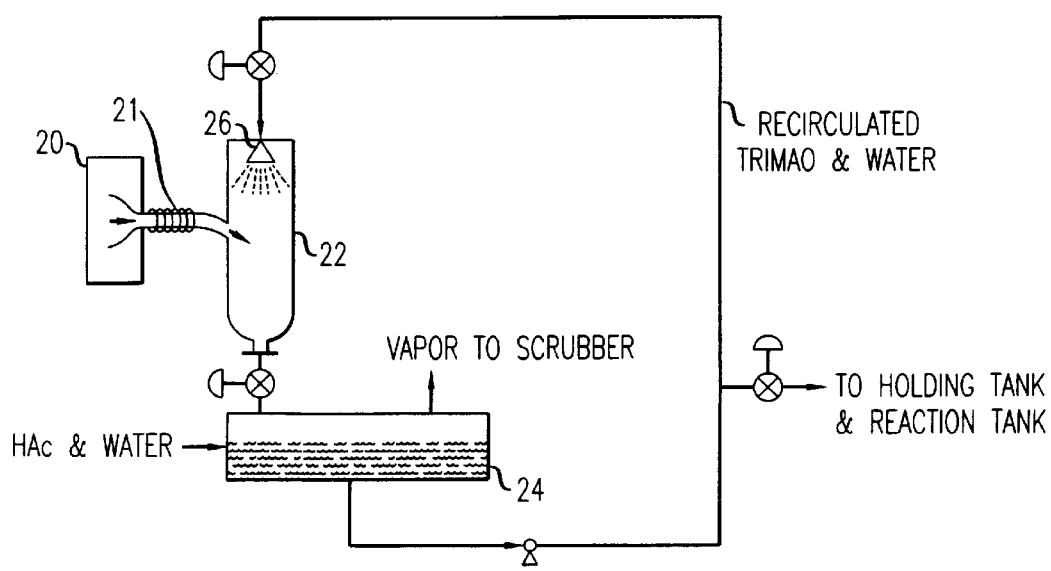
FIG. 2 schematically illustrates a gas-liquid contactor suitable for use in the embodiment reflected in FIG. 1.

A gas/liquid contactor apparatus suitable for use in the above apparatus is shown in FIG. 2 (the contactor is referred to herein as a spray condenser). During the step of heating a sol-gel body to drive off volatile organic materials, TRIMA vapor (and other organics) and non-condensible gases, e.g., $N_2$ and CO, from a furnace 20 of an optical fiber preform manufacturing process is passed into a spray condenser 22. The vapor passes from the furnace 20 to the spray condenser 22 through a heated entrance tube 21, the heat (generally about 350° C. or higher) substantially preventing condensation of organic materials in the tube 21. Recirculated acetic acid, TRIMA salt solution, and water are directed into the spray condenser 22 from a TRIMA/acetic acid tank 24 (where tank 24 serves the function of tank 12 in FIG. 1). The recirculated solution is directed into the spray condenser by a spray nozzle 26, to capture the TRIMA vapor in the solution and convert the vapor to TRIMA salt form. The aqueous acid is fed to the tank 24 in an amount appropriate to convert the TRIMA vapor. The equipment used in the apparatus, e.g., the spray condenser and associated flanges and pipes, are generally made from materials exhibiting high thermal shock and corrosion resistance, e.g., quartz and Hastelloy®.

In another embodiment of the invention, TRIMA in gaseous form is treated directly with aqueous hydrogen peroxide solution to form TRIMAO. Specifically, the gaseous TRIMA is directly contacted with aqueous hydrogen peroxide, typically by use of any conventional gas-liquid contactor, as discussed in *Chemical Engineers Handbook*, referenced previously. Again, the $H_2O_2$:TRIMA mole ratio is at least about 3:1, more advantageously at least about 10:1, and this ratio is appropriate for other trialkylamines with 6 or less carbon atoms as well. It is possible to use a control sample to determine the appropriate $H_2O_2$ solution feed rate, pH, and $H_2O_2$:TRIMA mole ratio for a particular set of parameters, e.g., gaseous TRIMA feed rate, TRIMA concentration, and temperature.

The reaction to form TRIMAO occurs in the contactor and/or downstream of the contactor. The off-gases of this embodiment will typically contain some gaseous TRIMA that remains unconverted. In such a case, it is desirable to either use a second gas-liquid contactor, or to treat the gaseous TRIMA by using an aqueous acid solution, as discussed above.

It is also advantageous in this embodiment to remove the remaining hydrogen peroxide before disposing of the TRIMAO-containing solution. Neutralization of the resultant solution is typically desired prior to sending the solution into the wastewater stream.

Figure 3:
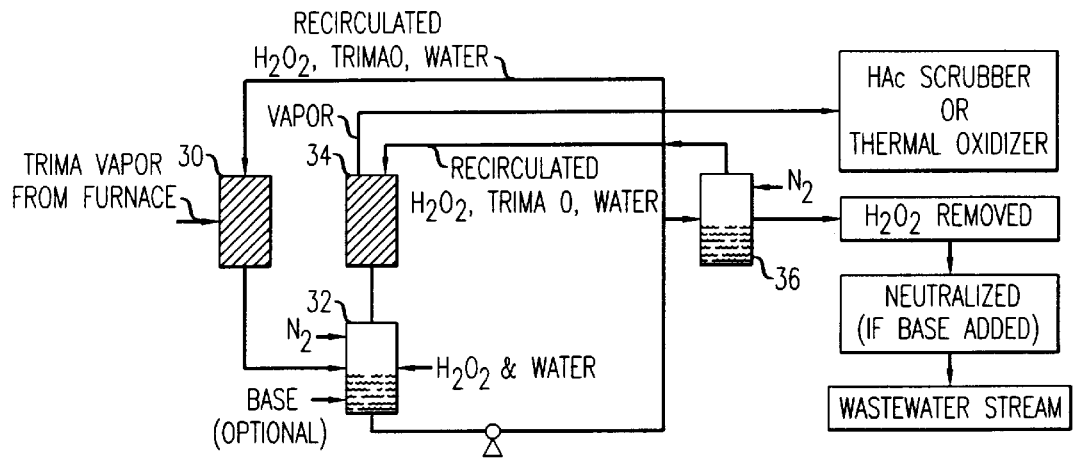
FIG. 3 schematically illustrates an apparatus suitable for practicing another embodiment of the invention.

This embodiment is reflected in FIG. 3. TRIMA vapor from an optical fiber preform fabrication process passes into a conventional gas/liquid contactor 30. A TRIMA, TRIMAO, $H_2O_2$, and water stream from tank 32 is recirculated through the contactor 30, with water and $H_2O_2$ metered into the tank 32 to maintain a desired $H_2O_2$ concentration. The aqueous $H_2O_2$ solution absorbs the TRIMA vapor, and the $H_2O_2$ in the recirculated stream converts the TRIMA to TRIMAO, which passes into the tank 32. Further conversion of TRIMA to TRIMAO occurs in the tank 32 (which is typically agitated). Optionally, base is added to the tank 32 to maintain a pH which increases the rate of conversion to TRIMAO. TRIMAO solution is directed from the recirculation stream into a secondary reaction tank 36, which allows for the desired amount of conversion to TRIMAO. The solution is then drawn off at a rate that assures this desired level of conversion has occurred. The TRIMAO solution is neutralized to a pH of about 7 (if base was added to tank 32), remaining $H_2O_2$ is removed, and the resultant solution is sent to the wastewater stream.

Off-gases, including TRIMA, from the tank 32 pass into a scrubber 34, and a portion of the $H_2O_2$ mixture from the tank 32 is recirculated into the scrubber 34 to convert the TRIMA off-gases to TRIMAO. TRIMA vapors from the scrubber 34 are either passed into an aqueous acid scrubber to be trapped and later converted to TRIMAO, or into a thermal oxidizer for combustion. In addition, an $N_2$ blanket is typically provided over the solution of the tank 32.

EXAMPLES

Example 1

Figure 4A:
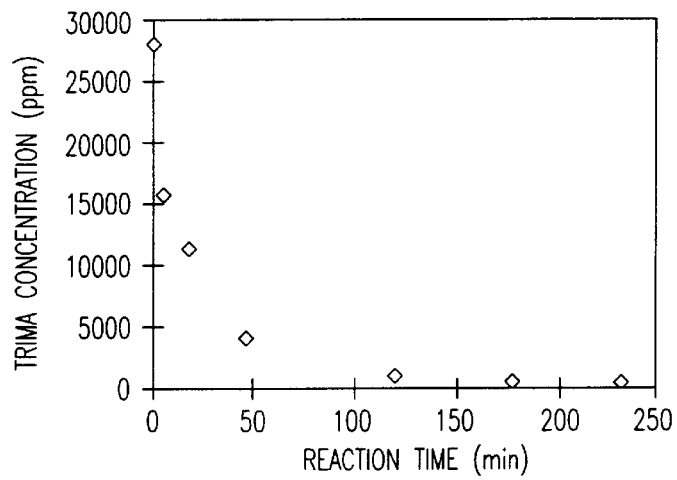
FIGS. 4A and 4B illustrate, respectively, the TRIMA concentration vs. reaction time, and the pH vs. reaction time, for one embodiment of the invention.
Figure 4B:
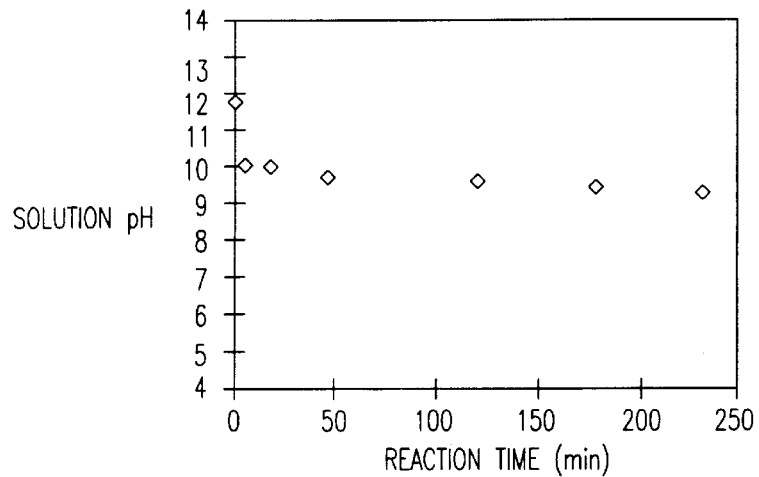

17.2 g nominal 30 wt. % $H_2O_2$ solution was mixed with 92.0 g water and 7.0 g nominal 40 wt. % TRIMA solution, resulting in a 3.2-fold molar excess of $H_2O_2$. The TRIMA concentration moved from about 28,400 ppm to less than 1000 ppm in about 2 hours, and to just above 600 ppm in about 4 hours. The pH dropped from about 12 to about 8 over those 4 hours. The concentration of TRIMA vs. reaction time is shown in FIG. 4A (the reaction time beginning upon addition of the hydrogen peroxide), and the pH vs. reaction time is shown in FIG. 4B. The data of FIG. 4A were obtained by taking reaction samples at timed intervals and quenching the samples by addition of acid to inhibit any further reaction of the TRIMA. The samples were analyzed by ion chromatography to determine the remaining amount of TRIMA.

Example 2

An aqueous acid TRIMA salt solution containing about 3.2 wt. % TRIMA and about 10 wt. % acetic acid was obtained from an overcladding tube fabrication process. The solution also contained relatively small amounts of other organic materials, e.g., 1.6 wt. % MeOH, 0.09 wt. % acetaldehyde, 0.03 wt. % methyl acetate and ethyl acetate, and less than 0.02 wt. % formaldehyde, methyl formate, and propional. 119.7 g of the TRIMA solution was mixed with 117.4 g of nominal 30 wt. % $H_2O_2$, resulting in a $H_2O_2$:TRIMA mole ratio of about 16:1. The initial pH was 4.27. The pH was brought to about 8 by addition of a 20 wt. % aqueous sodium hydroxide solution, in order to induce generation of free TRIMA in solution. The pH of about 8 was maintained by addition of several mL at a time of the sodium hydroxide solution, for the first 344 minutes of the reaction. At 344 minutes, the pH was brought to 10 by further addition of sodium hydroxide. A total of 26.0 mL of the sodium hydroxide solution was added. The last sample from the reactants was taken at 1542 minutes, at which time the pH was 9.6. (Raising the pH above 6 resulted in evolution of bubbles and heat. The sodium hydroxide was added a few mL at a time to maintain control of the reaction and reduce the evaporation of TRIMA. It is believed that the bubbles and heat were due to oxidation by the $H_2O_2$ of other organics in the solution, and/or by decomposition of the $H_2O_2$.)

The percentage of TRIMA converted to TRIMAO vs. reaction time is shown in FIG. 5A (the reaction time beginning upon addition of the sodium hydroxide), and the pH vs. reaction time is shown in FIG. 5B. The data of FIG. 5A were obtained in the same manner as Example 1, and, in addition, proton NMR was used to confirm the amount of TRIMAO, although the precision of the proton NMR was not enough to confirm a 1:1 stoichiometry between the initial amount of TRIMA and the final amount of TRIMAO. Complete conversion to TRIMAO was not obtained after 1542 minutes of the reaction.

Example 3

The same aqueous acid TRIMA solution of Example 2 was used. 119.8 g of the TRIMA solution was mixed with 35.1 g water and 78.5 g of nominal 30 wt. % $H_2O_2$, resulting in a $H_2O_2$:TRIMA mole ratio of about 10:1. The initial pH was 4.24. The pH was brought to about 8 by addition of a 20 wt. % aqueous sodium hydroxide solution, in order to induce generation of free TRIMA in solution. A pH of about 8 was maintained by addition of several mL at a time of the sodium hydroxide solution, for the first 339 minutes of the reaction. At 339 minutes, the pH was brought to about 10 by further addition of sodium hydroxide. A total of 20.0 mL of the sodium hydroxide solution was added. The last sample from the reactants was taken at 1290 minutes, at which time the pH was 9.8. Again, raising the pH above 6 resulted in evolution of bubbles and heat.

Figure 6A:
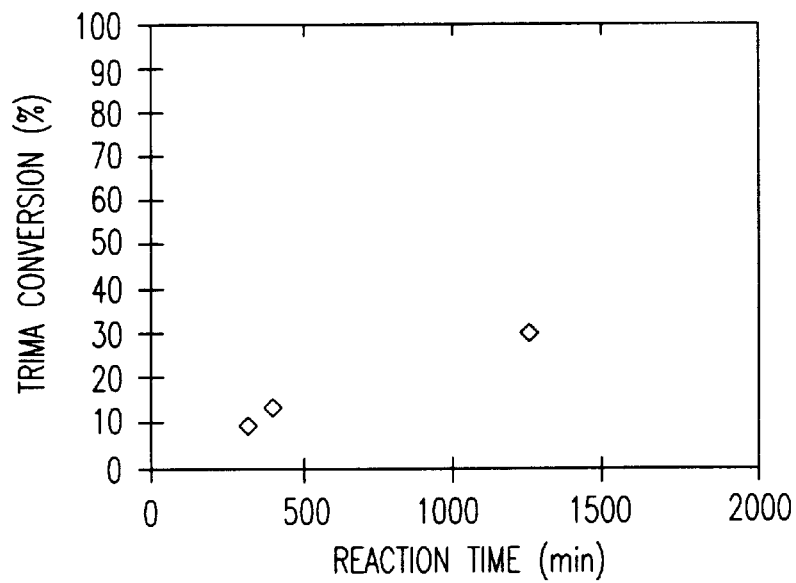
FIGS. 6A and 6B illustrate, respectively, the percentage of TRIMA converted to TRIMAO vs. reaction time, and the pH vs. reaction time, for an additional embodiment of the invention.
Figure 6B:
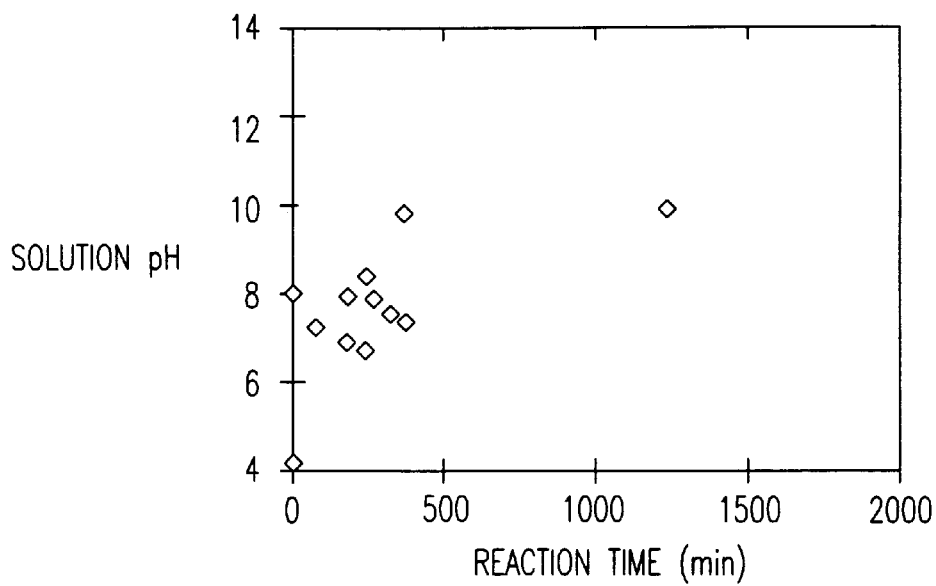

The percentage of TRIMA converted to TRIMAO vs. reaction time is shown in FIG. 6A (the reaction time beginning upon addition of the sodium hydroxide), and the pH vs. reaction time is shown in FIG. 6B. The data of FIG. 6A were obtained in the same manner as Example 2. Again, complete conversion was not obtained after 1290 minutes of reaction. The lower $H_2O_2$:TRIMA ratio of this Example led to a slower reaction rate than Example 2.

Example 4

The same aqueous acid TRIMA solution of Example 2 was used. 119.5 g of the TRIMA solution was mixed with 35.2 g water and 78.4 g of nominal 30 wt. % $H_2O_2$, resulting in a $H_2O_2$:TRIMA mole ratio of about 10:1. The initial pH was 4.45. 45.0 mL of a 20 wt. % aqueous sodium hydroxide solution was added a few mL at a time over the first 52 minutes of the reaction. At the end of 52 minutes, the pH was 10.4. Between 52 minutes and 128 minutes, the pH drifted up to 13.0, and between 128 minutes and 1263 minutes, the pH stayed at about 13.0. The same tests as used above showed that more than 99% of the TRIMA was oxidized to TRIMAO in less than 255 minutes.

Figure 7A:
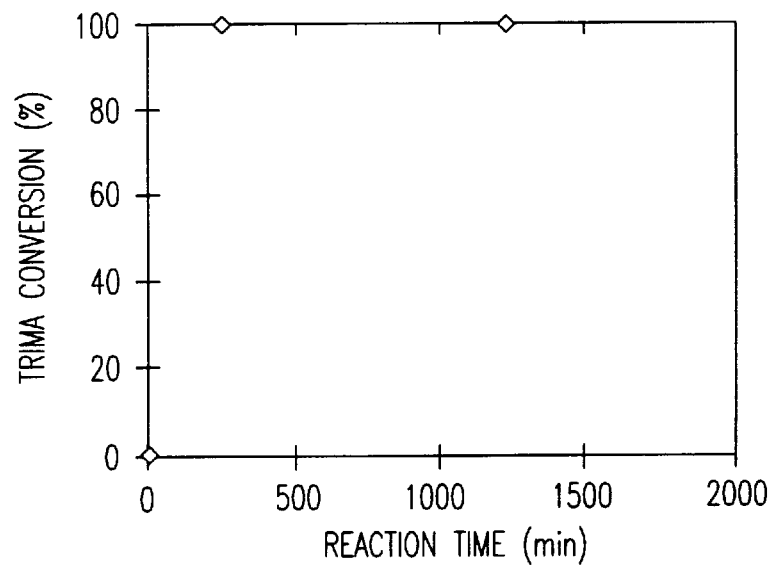
FIGS. 7A and 7B illustrate, respectively, the percentage of TRIMA converted to TRIMAO vs. reaction time, and the pH vs. reaction time, for a further embodiment of the invention.
Figure 7B:
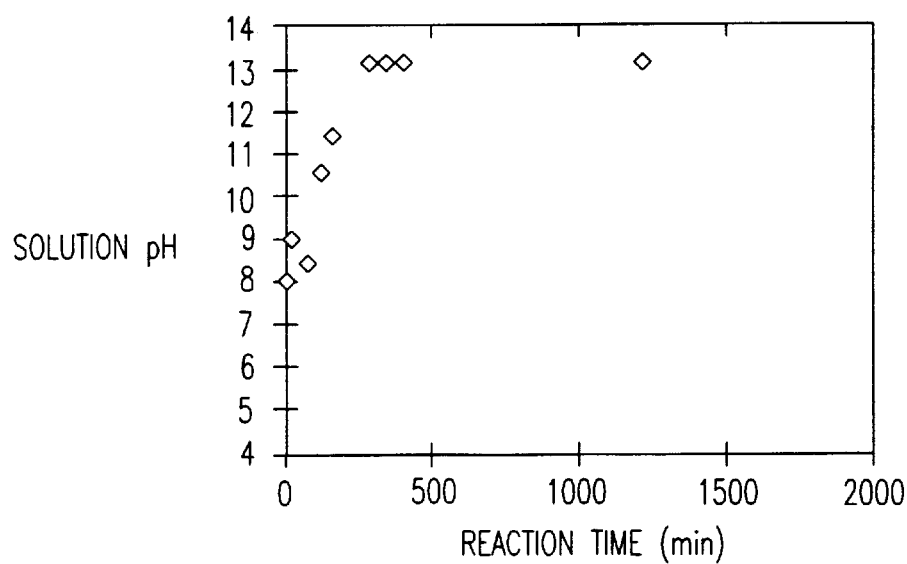

The percentage of TRIMA converted to TRIMAO vs. reaction time is shown in FIG. 7A (the reaction time beginning upon addition of the sodium hydroxide), and the pH vs. reaction time is shown in FIG. 7B. The data of FIG. 7A was obtained in the same manner as Example 2.

Other embodiments of the invention will be apparent to those skilled in the art from consideration of the specification and practice of the invention disclosed herein.

What is claimed is:

1. A process for treating a by-product of an optical fabrication process, comprising the steps of:

providing an acidic aqueous trialkylamine salt solution by-product of said process, wherein the trialkylamine has 6 or less carbon atoms;

adjusting the pH of the solution, by adding a base, to about 8 or higher to free trialkylamine from the salt; and interacting the freed trialkylamine with hydrogen peroxide to promote oxidation of the trialkylamine.

2. The process of claim 1, further comprising the step of adding an acid to the solution subsequent to the oxidation to lower the pH value.

3. The process of claim 1, wherein the pH is adjusted to about 13 or higher.

4. The process of claim 1, wherein the mole ratio of hydrogen peroxide:trialkylamine is at least 3:1.

5. The process of claim 3, wherein the mole ratio of hydrogen peroxide:trialkylamine is at least 10:1.

6. The process of claim 1, wherein the pH is adjusted to about 8 or higher subsequent to mixing the hydrogen peroxide with the acidic aqueous solution.

7. The process of claim 1, wherein the pH is adjusted to about 8 or higher prior to mixing the hydrogen peroxide with the acidic aqueous solution.

8. The process of claim 1, wherein the pH is adjusted by the addition of an alkali selected from at least one of sodium hydroxide and potassium hydroxide.

9. The process of claim 1, wherein at least 98% by weight of the trialkylamine is converted to a trialkylamine oxide or a product capable of being treated by a standard wastewater treatment plant.

10. The process of claim 1, wherein the aqueous acid is selected from at least one of acetic acid, citric acid, and sulfuric acid.

11. The process of claim 1, wherein the aqueous acid solution containing the trialkylamine is provided by contacting gaseous trialkylamine with the aqueous acid solution in a gas/liquid contactor.

12. The process of claim 1, further comprising the step of removing excess hydrogen peroxide.

13. The process of claim 12, wherein the hydrogen peroxide is decomposed by a catalytic reaction.

14. The process of claim 13, wherein the decomposition is performed by passing the solution over a material selected from finely divided platinum and a transition metal oxide.

15. The process of claim 12, wherein the hydrogen peroxide is decomposed by an enzymatic reaction.

16. The process of claim 15, wherein catalase is used for the enzymatic reaction.

17. A process for treating a by-product of an optical fiber fabrication process, comprising the steps of:

providing a gaseous trialkylamine by-product of said process, wherein the trialkylamine has 6 or less carbon atoms; and interacting the gaseous trialkylamine with aqueous hydrogen peroxide to promote oxidation of the trialkylamine.

18. The process of claim 17, where the contact is performed in a gas/liquid contactor.

19. The process of claim 17, further comprising the step of adding a base to the trialkylamine-containing solution.

* * * * *